3,640,914
FLAME-RESISTANT FOAMED RESIN
COMPOSITION
Masao Ogawa, Tokyo, Teruyuki Enjoji, Oita-ken, and Humio Arai, Kanagawa-ken, Japan, assignors to Showa Denko Kabushiki Kaisha, Tokyo, Japan
No Drawing. Filed Mar. 11, 1969, Ser. No. 806,286
Int. Cl. C08f 29/22, 47/10
U.S. Cl. 260—2.5 FP         5 Claims

ABSTRACT OF THE DISCLOSURE

A foamed resin composition of a high flame resistance, which comprises a three-component resin of acrylonitrile/chlorinated polyethylene/styrene, and a small amount of diantimony trioxide.

---

This invention relates to a novel flame-resistant foamed product of three-component polymeric composition composed of acrylonitrile, styrene and chlorinated polyethylene, and a process for the preparation thereof.

Foamed products of olefinic compound polymer such as polystyrene or polyethylene are known. They are used as heat insulating material, shock-absorbing material, and the like. It is also practiced to impart flame resistance to such products, using suitable chemical agents. However, since those polymers are themselves combustible, a large amount of flame resistance-imparting agent, such as 10–20 wt. percent of chlorowax, and also as large amount of an assistant, such as 10–20 wt. percent of diantimony trioxide, must be blended to impart satisfactory flame resistance to their foamed products. Consequently in the resulting foamed products, the favorable properties of the base or substrate polymers are markedly impaired due to the presence of such large amounts of the additives. For example, such objectionable effects as increase in specific gravity of the foamed products, reduction in impact strength, or increase in the preparation cost, are observed, which obviously incurred various restrictions on the application of such products.

Whereas, it is now discovered that the above drawbacks can be effectively overcome by employing the three-component polymeric composition consisting of acrylonitrile, styrene and chlorinated polyethylene as the starting material, and foaming the same in accordance with the method of this invention. Such three-component polymeric compositions and process for their preparation are disclosed in Japanese Official Patent Gazette, Publication Nos. 17,057/64 and 6,351/66, and U.S. Pat. application Ser. No. 339,899 (filed Jan. 24, 1964), now Pat. No. 3,496,256 and its continuation-in-part application Serial No. 784,517 (filed Nov. 22, 1968). Those polymeric compositions are thermoplastic resin having high tensile and impact strengths, excellent weatherability, good processability and dimensional stability. The compositions also exhibit good flame resistance, but are not self-extinguishing.

We have now discovered that the above three-component resin compositions give excellent self-extinguishing or non-combustible foamed products, when blown by heating in the concurrent presence of a chemical blowing agent and only a very minor amount of diantimony trioxide. Such excellent flame resistance-imparting effect by simply the concurrent presence of such minor amount of diantimony trioxide was entirely unexpected. The effect is manifested only upon blowing the resin composition in the concurrent presence of a minor amount of diantimony trioxide, but never before the blowing treatment, that is, not when diantimony trioxide is simply added to the resinous starting composition. The product obtained in accordance with the present invention possesses uniform, fine, closed cells, retains preferred properties of the substrate resin composition, and furthermore is self-extinguishing or non-combustible. Accordingly, this foam is suited for wide application such as construction materials, parts of decorative furnitures, heat and electrical insulating materials, and other various shaped articles.

The object of the invention is, therefore, to provide novel resin foams of excellent quality which are imparted with flame resistance by the use of such minor amount of diantimony trioxide which is insufficient to render the resin composition before blowing treatment flame-resistant; and also to provide a process for their preparation.

Another object of the invention is to provide flame-resistant resin foams which are useful as various shaped articles.

Other objects and advantages of the invention will become clear from the following description.

The foamed resin composition of a high flame resistance in accordance with the invention comprises a foamed three-component resin containing 1–5 phr. of diantimony trioxide, said three-component resin consisting of:

(a) chlorinated polyethylene having a degree of chlorination of 20–50% by weight,
(b) acrylonitrile, and
(c) styrene, the weight ratio of above (a) to (b) plus (c) ranging from 50:50 to 10:90, and the weight ratio of (b) to (c) ranging from 10:90 to 90:10.

The invention will be explained in further details hereinbelow.

The substrate resin composition employed in the invention consists essentially of the three components of acrylonitrile, styrene, and chlorinated polyethylene. The composition can be obtained by mechanically blending 50–90 wt. percent of acrylonitrile styrene copolymer (acrylonitrile:styrene=10:90–90:10 by weight) with 50–10 wt. percent of chlorinated polyethylene containing 20–50 wt. percent of chlorine, or by copolymerizing 50–90 wt. percent of a monomeric acrylonitrile-styrene mixture at the above-specified mixing ratio, in the presence of 50–10 wt. percent of the above chlorinated polyethylene. For simplicity, the former may be hereafter referred to as blend type composition, and the latter, as graft type composition. Both types give similar results in accordance with the invention.

In this invention, the term "chlorinated polyethylene" should be understood to include, besides chlorinated polyethylene, chlorinated ethylene copolymers such as chlorinated ethylene-propylene copolymer, ethylene-butene-1 copolymer wherein the ethylene component is predominant. The chlorination is conducted by aqueous suspension or solution process. The chlorine content of the chlorinated polyethylene employed in the invention ranges 20–50 wt. percent, preferably 30–40 wt. percent.

When the chlorine content is excessively high, the resulting foams become rigid and exhibit reduced impact strength. Whereas, if the chlorine content is too low, the foams fail to show sufficient flame resistance, and in which the chlorinated polyethylene component shows poor compatibility with other two components, to reduce the mechanical strength of the foamed product.

The weight ratio of the components in the resin composition is, to 50–90% of acrylonitrile plus styrene component, 50–10% of the chlorinated polyethylene component is used. At weight ratios outside the above-specified range, the intended excellent products can never be obtained. In the acrylonitrile-styrene component, the weight ratio of the two is variable within the range of each 10 to 90%. However, the copolymerization of acrylonitrile and styrene is most conveniently conducted when the former is approximately 20–30 wt. percent, and the latter is approximately 80–70 wt. percent.

In the invention, the agent used for imparting flame resistance to the product is diantimony trioxide. Various compounds are known as the flame resistance-imparting agents for conventional resin, but it is discovered that diantimony trioxide is uniquely effective for the practice of this invention. Furthermore, it is most surprising that as little as 1–5 phr. (parts by weight to 100 wt. parts of resin composition) of diantimony trioxide exhibits very excellent effect. When it is used at an amount more than 5 phr., proportionally increased flame resistance-imparting effect is not exhibited, while the favorable properties inherent in the resin composition is impaired by such weight increase in diantimony trioxide content.

The chemical flowing agent employed for making the foamed resin composition of the invention can be a compound which decomposes and generates gas at the temperatures between melting point and decomposition point of the three-component resin composition, similarly to those used in blowing of conventional resins. Therefore, those conventionally used chemical blowing agents which decompose at approximately 100–250° C. can be used, which include dinitrosopentamethylenetetramine, sulfonic acid hydrazides, azodicarbonamide, and sodium bicarbonate. Particularly azodicarbonamide gives foamed product of excellent flame resistance, having uniform and fine closed cells. The amount of the chemical blowing agent normally ranges 0.1–5 phr., and is suitably selected according to the desired foaming ratio.

When the above-described three-component resin composition, diantimony trioxide and a chemical blowing agent, each at the predetermined amount, are intimately blended at a temperature below the decomposition temperature of the blowing agent, a foamable composition is formed. The blending can be effected, for example, by roll milling, or mixing in an extruder. Upon heating the foamable composition to a temperature above the decomposition point of the blowing agent, the object foamed resin composition is obtained. It is also possible to directly dry blend the resin composition, diantimony trioxide and blowing agent, that is, the same foamed product can be obtained by mixing the three using an extruder or an injection molding machine and simultaneously therewith heating the mixture at a temperature above the decomposition point of the blowing agent. When azodicarbonamide is used as the blowing agent and the components are dry blended by means of an extruder, foamed resin composition having fine closed cells having diameters ranging, for example, 20–60 microns is obtained.

The foamed product is self-extinguishing or non-combustible, although the amount of diantimony trioxide employed is extremely minor. Since the product has uniform closed cells, it provides excellent heat insulating and acoustic absorption materials. Furthermore, it exhibits high impact strength and consequently, excellent shock absorption. The product also shows characteristically high weatherability.

A three-component resin composition known as ABS resin consisting of acrylonitrile, butadiene and styrene has been commercialized, and foamed product thereof is also available. However the foamed product of this invention is far superior to that, particularly in flame resistance and weatherability. Furthermore, when ABS resin is foamed in the presence of such minor amount of diantimony trioxide as employed in this invention, the resulting foams do not exhibit the flame resistance.

The foamed products of this invention thus exhibit various excellent characteristics, and the surfaces thereof possess beautiful silvery white luster. This aspect renders the material particularly suitable for use in construction, interior decoration, and other various fields.

Hereinafter the invention will be explained referring to working examples, it being understood that the examples are in no way to restrict the scope of this invention.

EXAMPLE 1

Thermoplastic resin (graft type composition)

The three-component resin compositions were prepared as follows:

A polyethylene prepared by low pressure polymerization process (density: 0.935 at 23° C., weight average molecular weight: $2.5 \times 10^5$) was chlorinated in an aqueous suspension system, to make two chlorinated polyethylenes with degrees of chlorination of, respectively, 30 and 40 wt. percent. Each 20–50 wt. parts of the chlorinated polyethylene was graft polymerized with each 80–50 wt. parts of acrylonitrile/styrene monomeric mixtures (weight ratios: 16/84 and 25/75), in the presence of a radical generating catalyst. Thus graft type three-component resins consisting of acrylonitrile, chlorinated polyethylene and styrene (hereinafter to be abbreviated as ACS resin) were formed.

Foamed resins

The above ACS resins were each added with 0.5–1.5 phr. of azodicarbonamide, or benzenesulfonylhydrazide, or sodium bicarbonate, as the blowing agent, 1–5 phr. of diantimony trioxide as the flame resistance-imparting agent, and 1 phr. of dibutyl tin maleate as a stabilizer. The resulting mixtures were dry blended in a Henshell mixer. Thus obtained foamable compositions were heated and foamed at 170° C. in an extruder of 40 mm. in diameter. Thus formed foamed resin sheets having closed cells had a thickness of ¼ inch, specific gravities ranging from 0.4–0.6 g./cc., and cells of 0.02–0.06 mm. in diameter.

Burning test

The foamed resin sheets are subjected to a burning test in accordance with the procedures described in ASTM, D1692–59T. Similar test was given to the samples not blended with diantimony trioxide as the controls, and also to conventional foamable ABS resin composition, acrylonitrile (24 parts)/styrene-butadiene rubber (20 parts)/styrene (56 parts) foamable graft type resin composition prepared by emulsion process for comparison.

The test results are collectively given in Table 1. In the table, the abbreviations used have the significations as follows:

A: Acrylonitrile ingredient
S: Styrene ingredient
CPE: Chlorinated polyethylene ingredient
SB: Self-burning
   The numerals denote rate of combustion, i.e. the advance rate of flame (inch/min.).
SE: Self-extinguishing
   The numerals denote the length (inch) of the test specimen remaining unburnt, the original length being 5 inches.
N: Non-combustible

TABLE 1

| Run No. | A/S ratio | A and S in the resin composition Weight part | CPE in the resin composition Chlorine content (wt. percent) | Weight part | Blowing agent Type | Amount (phr.) | Diantimony trioxide added, amount (phr.) 0 (control) | | 1 | | 2 | | 3 | | 5 | |
|---|---|---|---|---|---|---|---|---|---|---|---|---|---|---|---|---|
| 1 | 16/84 | 80 | 30 | 20 | Azodicarbamide | 0.5 | SB | 0.30 | SE | 2.3 | SE | 4.2 | SE | 4.8 | N | |
| 2 | 25/75 | 80 | 30 | 20 | ...do... | 0.5 | SB | 0.25 | SE | 2.5 | SE | 3.8 | SE | 4.9 | N | |
| 3 | 16/84 | 70 | 30 | 30 | ...do... | 0.5 | SB | 0.25 | SE | 3.1 | SE | 4.4 | SE | 4.9 | N | |
| 4 | 25/75 | 70 | 40 | 30 | ...do... | 1.0 | SB | 0.18 | SE | 4.6 | SE | 4.7 | N | | N | |
| 5 | 25/75 | 50 | 40 | 50 | ...do... | 1.0 | SB | 0.15 | SE | 4.8 | N | | N | | N | |
| 6 | 16/84 | 80 | 30 | 20 | Benzenesulfonylhydrazide. | 0.5 | SB | 0.32 | SE | 2.0 | SE | 4.0 | SE | 4.8 | N | |
| 7 | 25/75 | 80 | 40 | 20 | ...do... | 1.0 | SB | 0.25 | SE | 3.4 | SE | 4.0 | SE | 4.9 | N | |
| 8 | 16/84 | 80 | 40 | 20 | Sodiumbicarbonate. | 1.5 | SB | 0.30 | SE | 2.5 | SE | 4.5 | SE | 4.7 | N | |
| 9 | 16/84 | 60 | 40 | 40 | ...do... | 1.5 | SB | 0.17 | SE | 4.4 | SE | 4.9 | N | | N | |
| 10 | Conventional foamable ABS composition | | | | | | SB | 1.25 | SB | 1.08 | SB | 1.03 | SB | 0.95 | SB | 0.78 |

As demonstrated in Table 1, the foams obtained by foaming ACS resin compositions blended with a blowing agent but not with diantimony trioxide (controls) were in all runs self-burning. In contrast thereto, the foams obtained under the addition of 1–5 phr. of diantimony trioxide (this invention) were either self-extinguishing or non-combustible without exception. Whereas, when diantimony trioxide of similar amounts used in this invention was added to conventional foamable ABS resin composition, the products were always self-burning.

Other physical properties of the foamed resin

The foamed resin of this invention thus exhibits excellent flame resistance, and concurrently possesses excellent weatherability and other physical properties. This is confirmed by the tests as follows.

(a) *Weatherability*.—A three-component resin was made by graft polymerization of 20 wt. parts of chlorinated polyethylene (degree of chlorination: 30%) with 80 wt. parts of acrylonitrile/styrene monomeric mixture (weight ratio: 20/80). To the composition 0.5 phr. of azodicarbonamide as a blowing agent, 0–5 phr. of diantimony trioxide as a flame resistance-imparting agent, and 1 phr. of dibutyl tin maleate as a stabilizer were added and dry blended. Each blended composition was foamed in an extruder of which die portion was heated at 170° C., to convert the compositions to foamed sheets. The sheets were used as the test samples, and their weatherability was tested with carbon arc type standard weatherometer. The testing conditions were as follows:

Black panel temperature: 65° C.±1° C.
Water spraying: Spray cycle of 12 minutes per hour
Irradiation: One-side irradiation of test specimens
Tensile test:
  ASTM D638–52T
  Specimen size, 216 x 13 x 3 (mm.) dumbbell form For comparison, identical test was given to the aforesaid conventional ABS resin composition.

The test results are given in Table 2, in which TS stands for tensile strength, and E stands for elongation.

TABLE 2

| Resin | $Sb_2O_3$, amount (phr.) | Irradiation time (hr.) | | | | | | | | |
|---|---|---|---|---|---|---|---|---|---|---|
| | | 0 | | 50 | | 100 | | 200 | | 400 | |
| | | TS, kg./cm.² | E, percent | TS, kg./cm.² | E, percent | TS, kg./cm.² | E, percent | TS, kg./cm.² | E, percent | TS, kg./cm.² | E, percent |
| ACS | 0 | 147 | 40 | 150 | 39 | 146 | 37 | 139 | 34 | 134 | 31 |
| | 3 | 148 | 20 | 151 | 18 | 138 | 17 | 132 | 15 | 127 | 12 |
| | 5 | 131 | 15 | 130 | 14 | 121 | 11 | 117 | 10 | 110 | 8 |
| ABS | 0 | 138 | 25 | 124 | 5 | 91 | 3 | 74 | 2 | 70 | 1 |
| | 3 | 140 | 18 | 125 | 3 | 86 | 2 | 59 | 1 | 55 | 0 |
| | 5 | 129 | 12 | 110 | 2 | 64 | 1 | 55 | 1 | 53 | 0 |

As can be understood from Table 2, the foamed ACS resin of the invention exhibits markedly superior weatherability compared with the conventional foamed ABS resin.

(b) *Water absorption, heat conductivity, bending strength and compression strength*.—As to the foamed ACS resins obtained by addition of 3 phr. of diantimony trioxide as shown in Table 1, the above properties were measured, with the results given below. In the parentheses the testing methods used are indicated.

Water absorption: Not higher than 0.28%, 24 hours (ASTM D570–63)
Heat conductivity: 0.075 kcal./m. hr. ° C. (ASTM C177–63)
Bending strength: 180 kg./cm.² (ASTM D790–61)
Compression strength: 109 kg./cm.², 10% distortion ASTM D1621–59T)

(c) *Density and impact strength*.—The same foams used in the above (a) weatherability test were measured of cell diameter, density and impact strength. The results are given in Table 3 below. The test methods employed were as follows:

TABLE 3

| Foamable resin composition | $Sb_2O_3$, amount (phr.) | Average diameter of the cell (μ) | Density (g./cc.) | Impact strength Notchy (ft.-lb./in.) | No notch (ft.-lb./in.) |
|---|---|---|---|---|---|
| ACS | 0 | 20 40 | 0.48 | 0.8 | 6.7 |
| | 3 | 30–50 | 9.55 | 0.6 | 5.0 |
| | 5 | 30– 0 | 9.59 | 0.5 | 4.5 |
| ABS (comparison) | 0 | 100–200 | 0.46 | 0.6 | 3.4 |
| | 3 | 100–300 | 0.51 | 0. | 2.9 |
| | 5 | 100–300 | 0.57 | 0.3 | 2.8 |

Density: ASTM D1622–59T
Impact test:
  ASTM D256–54T
  Test specimen: 0.5 x 0.5 x 2.5 (inch) in size, a square pillar form As demonstrated in Table 3, the foamed ACS resin in accordance with this invention possesses better physical properties than those of conventional foamed ABS resin. The properties are slightly variable depending on the blended amount of diantimony trioxide, but remarkable reduction as will interfere with practical utility of the foamed product never takes place.

EXAMPLE 2

Thermoplastic resin (blend type composition)

Three-component resin compositions employed were made as follows:

Ten to fifty weight parts of the chlorinated polyethylene (degree of chlorination: 30-40 wt. percent) obtained similarly to that in Example 1 was blended with 50-90 wt. parts of an acrylonitrile/styrene copolymer (weight ratio: 27/73), and each 100 wt. parts of blended ACS resins were prepared.

As control samples, polybutadiene (PBR) having a Mooney viscosity of 35 at 100° C. was blended with the same acrylonitrile/styrene copolymer at the weight ratios as employed in the above, to provide conventional blended ABS resin compositions.

Foamed resins

Each of the above resin compositions was added with 3-5 phr. of azodicarbonamide or dinitrosopentamethylene-tetramine (DPT) as the blowing agent, 1-5 phr. of diantimony trioxide as the flame resistance-imparting agent, and 1 phr. of dibutyl tin maleate as the stabilizer, followed by roll milling at 160° C. for 5 hours. Thus obtained foamable compositions were maintained at 240° C. and 60 kg./cm.$^2$ in a pressing machine for 4 minutes. Thus foamed samples of each 0.1 x 0.5 x 5 inches in size were prepared. The specific gravities of the foamed ACS and ABS resins ranged from 0.35-0.50 g./cc.

Burning test

The samples (Run Nos. 11-18) were subjected to a burning test in accordance with ASTM D635-56T. As controls, the samples in which addition of diantimony trioxide was omitted were subjected to the same test.

Also for comparison, the combustibility of corresponding foamable ACS resin compositions before the foaming was tested (Run Nos. 11', 12', 14' and 15').

The conventional, foamed ABS resins (Run Nos. 19-21) were also given the identical test.

The results are given in Table 4, in which the abbreviations have the same signification as specified as to Table 1, except that the numerals given for self-extinguishing (SE) property denote the length of sample remained unburnt in inch, the original length being 3 inches.

presence of 1-5 phr. of diantimony trioxide were in all runs either self-extinguishing or non-combustible. It should be particularly noted that, even after the addition of similar amounts of diantimony trioxide, the same ACS resin compositions before the foaming were in most cases self-burning. Again the foamed resins prepared by foaming conventional blend type ABS resins as blended with a blowing agent and diantimony trioxide, (comparison runs) were also self-burning without exception.

What is claimed is:
1. A foamable resin composition which comprises
  (A) a three-component resin consisting of (a) chlorinated polyethylene having a degree of chlorination of 20-50% by weight, (b) acrylonitrile, and (c) styrene, the weight ratio of (a) to (b) plus (c) being from 50:50 to 10:90, and the weight ratio of (b) to (c) being from 10:90 to 90:10,
  (B) 1-5 parts by weight per 100 parts by weight of (A) of diantimony trioxide, and
  (C) 0.1-5 parts by weight per 100 parts by weight of (A) of a chemical blowing agent selected from dinitrosopentamethylenetetramine, sulfonic acid hydrazides, azodicarbonamide and sodium bicarbonate which decomposes and generates a gas at a temperature between the melting point and decomposition temperature of said three-component resin.
2. A process for the preparation of a foamed resin composition having a high flame resistance, which comprises blowing by heating a homogeneous mixture of
  (A) a three-component resin consisting of (a) chlorinated polyethylene having a degree of chlorination of 20-50% by weight, (b) acrylonitrile, and (c) styrene, the weight ratio of (a) to (b) plus (c) being from 50:50 to 10:90, and the weight ratio of (b) to (c) being from 10:90 to 90:10,
  (B) 1-5 parts by weight per 100 parts by weight of (A) of diantimony trioxide, and
  (C) 0.1-5 parts by weight per 100 parts by weight of (A) of a chemical blowing agent selected from dinitrosopentamethylenetetramine, sulfonic acid hydrazides, azodicarbonamide and sodium bicarbonate which decomposes and generates a gas at a temperature between the melting point and decomposition temperature of said three-component resin, and recovering the resulting foamed resin composition.
3. A foamed resin composition of high flame resistance obtained by the process of claim 2.
4. The foamed resin composition of claim 3, wherein

TABLE 4

| Run No. | Type of resin | 7A/S (2/73) weight, part | CPE in the resin composition Chlorine content (wt. percent) | Weight, part | Blowing agent Type | Amount (phr.) | Diantimony trioxide added, amount (phr.) 0 (control) | 1 | 2 | 3 | 5 |
|---|---|---|---|---|---|---|---|---|---|---|---|
| 11 | Foamed ACS (blend type) | 60 | 30 | 40 | Azodicarbamide | 3 | SB 0.37 | SE 2.5 | SE 2.9 | N ---- | N ---- |
| 12 | | 72 | 30 | 28 | do | 3 | SB 0.43 | SE 1.8 | SE 2.5 | SE 2.8 | N ---- |
| 13 | | 80 | 40 | 20 | do | 3 | SB 0.55 | SE 1.5 | SE 2.1 | SE 2.9 | N ---- |
| 14 | | 90 | 40 | 10 | do | 3 | SB 0.75 | SE 0.5 | SE 1.8 | SE 2.5 | SE 2.9 |
| 15 | | 50 | 40 | 50 | do | 5 | SB 0.35 | SE 2.9 | N ---- | N ---- | N ---- |
| 16 | | 60 | 30 | 40 | DPT | 3 | SB 0.39 | SE 2.4 | SE 2.9 | N ---- | N ---- |
| 17 | | 72 | 30 | 28 | do | 3 | SB 0.48 | SE 1.0 | SE 2.4 | SE 2.9 | N ---- |
| 18 | | 50 | 40 | 50 | do | 5 | SB 0.28 | SE 2.8 | N ---- | N ---- | N ---- |
| 11' | Foamable ACS (before foaming) | 60 | 30 | 40 | | | SB 0.89 | SB 0.8 | SB 0.54 | SB 0.31 | SE 1.5 |
| 12' | | 72 | 30 | 28 | | | SB 1.00 | SB 0.91 | SB 0.75 | SB 0.53 | SB 0.18 |
| 14' | | 90 | 40 | 10 | | | SB 1.37 | SB 1.30 | SB 1.15 | SB 1.02 | SB 0.85 |
| 15' | | 50 | 40 | 50 | | | SB 0.45 | SB 0.27 | SE 0.10 | SE 1.9 | SE 2.6 |
| 19 | Foamed ABS | 80 | PBR | 20 | Azodicarbamide | 3 | SB 2.40 | SB 2.00 | SB 1.85 | SB 1.85 | SB 1.80 |
| 20 | | 50 | PBR | 50 | do | 5 | SB 1.90 | SB 1.70 | SB 1.60 | SB 1.50 | SB 1.30 |
| 21 | | 72 | PBR | 28 | DPT | 3 | SB 2.30 | SB 2.00 | SB 2.00 | SB 1.80 | SB 1.80 |

As can be understood from Table 4, the foamed resins (controls) obtained by foaming ACS resins as blended with blowing agent in the absence of diantimony trioxide were in all runs self-burning. In contrast thereto, the foamed resins (this invention) which were foamed in the the three-component resin is that prepared by the polymeri-blending of (a) component with a copolymer of (b) and (c) components.

zation of a monomeric mixture of (b) and (c) components in the presence of (a) component.

5. A foamed resin composition of claim 3, wherein the three-component resin is that prepared by mechanical

References Cited
UNITED STATES PATENTS

| | | | |
|---|---|---|---|
| 2,628,945 | 2/1953 | Wayne | 260—2.5 |
| 3,113,118 | 12/1963 | Canterino et al. | 260—45.75 |
| 3,143,521 | 8/1964 | Thompson et al. | 260—878 |
| 3,158,665 | 11/1964 | Herbig et al. | 260—897 |
| 3,498,934 | 3/1970 | Kraemer et al. | 260—2.5 |

MURRAY TILLMAN, Primary Examiner

W. J. BRIGGS, Sr., Assistant Examiner

U.S. Cl. X.R.

260—45.75 R, 878 R, 886, 897 R, DIG 24

UNITED STATES PATENT OFFICE
CERTIFICATE OF CORRECTION

Patent No. 3,640,914      Dated February 8, 1972

Inventor(s) Masao Ogawa et al.

It is certified that error appears in the above-identified patent and that said Letters Patent are hereby corrected as shown below:

Claim 4, delete lines 3 and 4 in their entirety.

Claim 5, after "mechanical" insert -- blending of (a) component with a copolymer of (b) and (c) components.

Signed and sealed this 4th day of July 1972.

(SEAL)
Attest:

EDWARD M. FLETCHER, JR.      ROBERT GOTTSCHALK
Attesting Officer      Commissioner of Patents